Dec. 15, 1970
K. H. WEISFELD
3,547,528
INSTRUMENT TO MEASURE FUSIONAL ABILITY
OF EYES INDEPENDENT OF EYE MOVEMENT
Filed Nov. 22, 1968
2 Sheets-Sheet 1
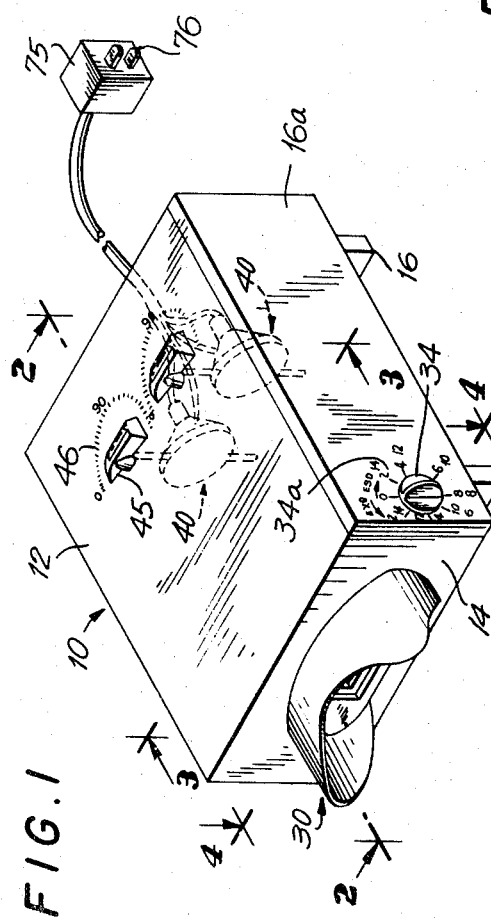
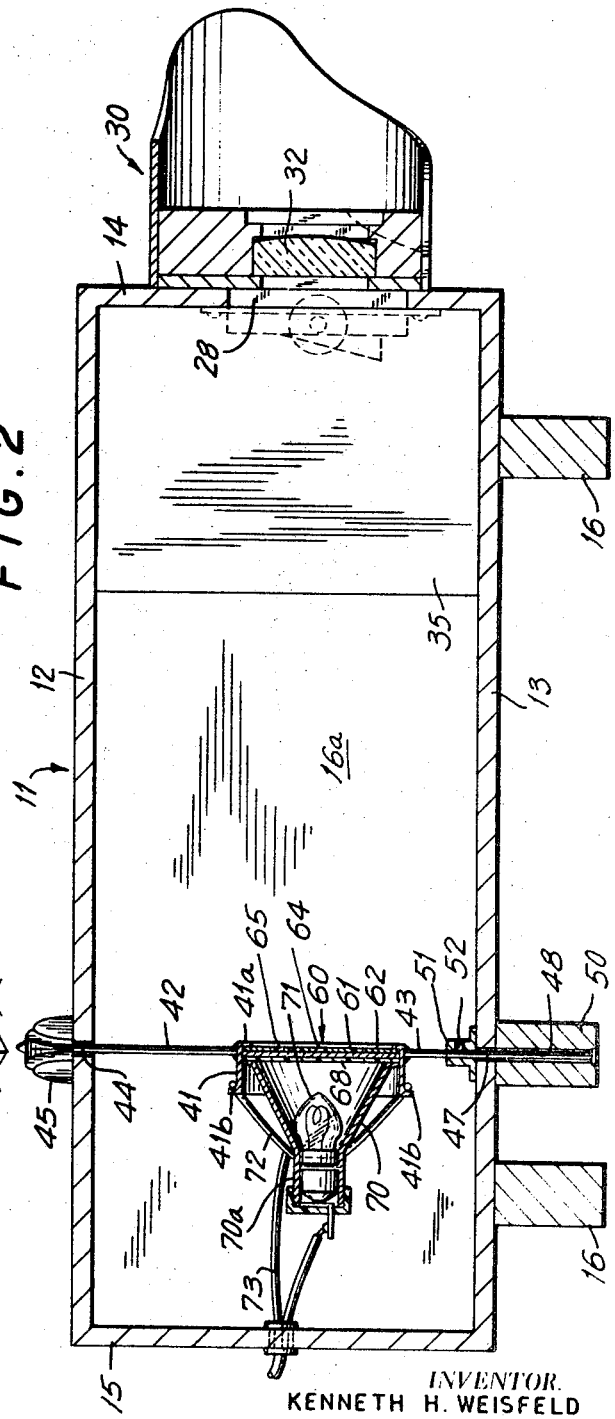
INVENTOR.
KENNETH H. WEISFELD
BY
J. B. Felshin
ATTORNEY Dec. 15, 1970    K. H. WEISFELD    3,547,528
INSTRUMENT TO MEASURE FUSIONAL ABILITY
OF EYES INDEPENDENT OF EYE MOVEMENT
Filed Nov. 22, 1968    2 Sheets-Sheet 2

INVENTOR.
KENNETH H. WEISFELD

BY
J. B. Felshin
ATTORNEY

__United States Patent Office__

3,547,528
Patented Dec. 15, 1970

3,547,528
INSTRUMENT TO MEASURE FUSIONAL ABILITY OF EYES INDEPENDENT OF EYE MOVEMENT
Kenneth H. Weisfeld, 6035 Broadway,
Bronx, N.Y. 10471
Filed Nov. 22, 1968, Ser. No. 778,146
Int. Cl. A61b 3/08
U.S. Cl. 351—3        13 Claims

ABSTRACT OF THE DISCLOSURE

This apparatus comprises a box which has a stereoptical eye piece at its front end. Between the top and bottom walls of the box and viewable through the eyepiece are a pair of similarly appearing illuminated targets which can be selectively contracted and expanded, with means to measure the degree of contraction and expansion of each target without necessity for the eyes to move. The targets are rotatable about a pair of fixed parallel axes.

BACKGROUND OF THE INVENTION

Field of the invention

This invention relates to apparatus for testing eyes helpful clinically to determine condition of the patient's eyes such as ability of the eyes to fuse dissimilar objects. These tests may additionally be helpful in testing the patient for phoria, ductions, stereopsis, supression and eye dominancy.

Description of the prior art

Apparatus for testing eyes with target devices that shift into different angular positions without shifting the test lenses are known.

SUMMARY OF THE INVENTION

An object of this invention is to provide apparatus of the character described in which a pair of similar appearing targets are provided, with means to view one target with one eye and the other target with the other eye, and means to selectively change one target away, from and toward normal while leaving the other target in normal appearing position, with means to measure the point where the two targets no longer appear similar as one target is moved away from normal, and the point where the targets again appear similar as the moved target is moved back to normal position.

Another object of this invention is to provide a highly improved apparatus to test the ability to maintain fusion of two gross objects whose centers are placed artifically on corresponding retinal points, with the eyes not moving, and in the phoric position, in the face of progressive and systematic increments in the dissimilarity of form between the two objects.

Another object of this invention is to provide apparatus of the character described which shall be simple to manipulate, relatively inexpensive to manufacture, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

BRIEF DESCRIPTION OF THE DRAWING

In the accompanying drawing, in which are shown various illustrative embodiments of this invention:

FIG. 1 is a front top perspective view of the apparatus embodying the invention;

FIG. 2 is a cross-sectional view taken on line 2—2 of FIG. 1;

FIG. 5 is a wiring diagram of the electrical part of the apparatus.

DESCRIPTION OF THE PREFERRED EMBODIMENTS

Figure 3:
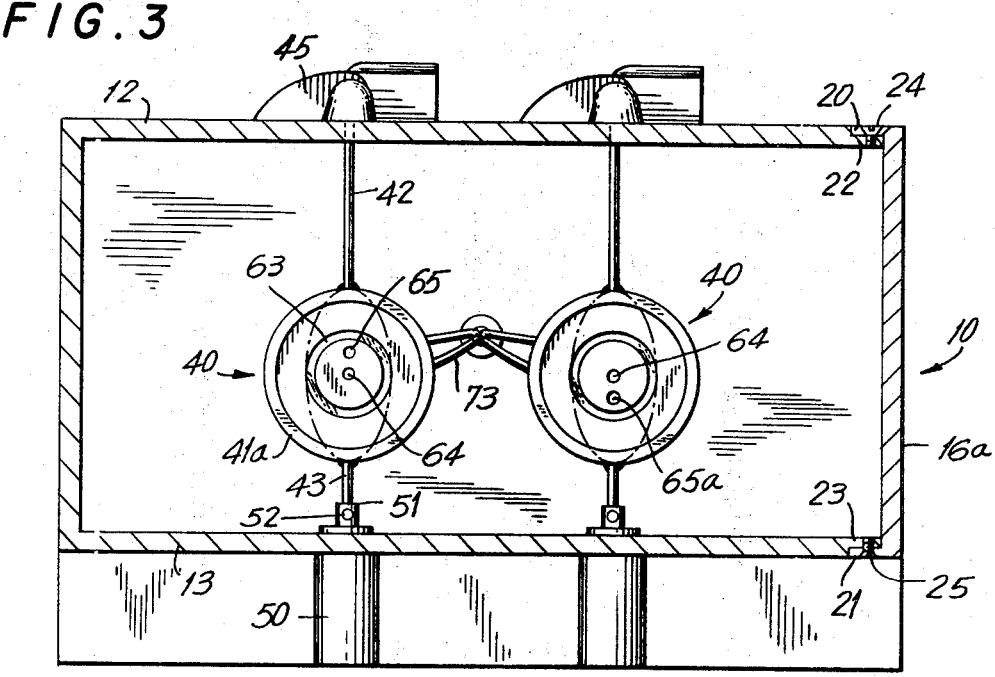
FIG. 3 is a cross-sectional view taken on line 3—3 of FIG. 1.
Figure 4:
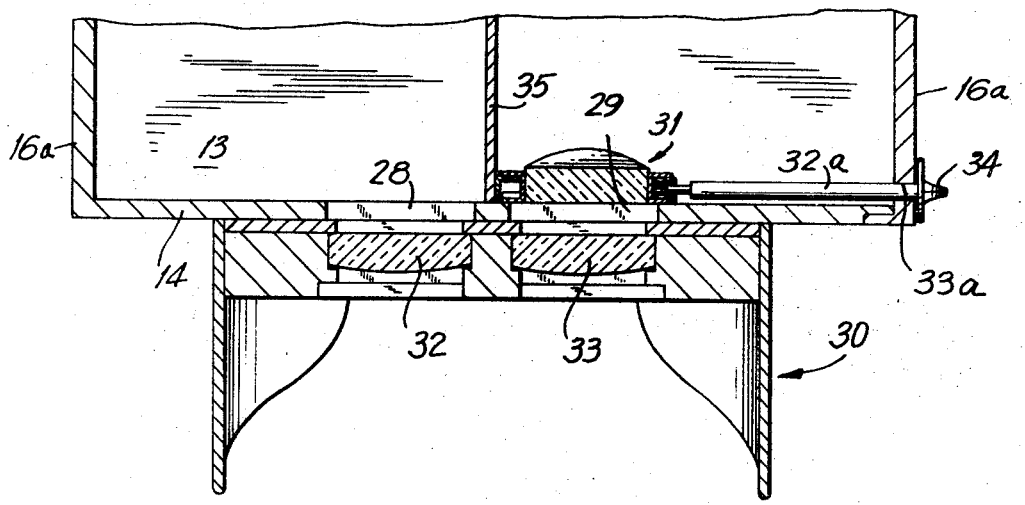
FIG. 4 is a cross-sectional view taken on line 4—4 of FIG. 1.

Referring now in detail to the drawing, 10 designates apparatus embodying the invention. Said apparatus 10 comprises a casing 11 having a top wall 12, a bottom wall 13, a front wall 14, a rear wall 15 and side walls 16a, 16a. The casing 10 is supported on front and rear legs 16 attached to the underside of bottom wall 13. One side wall 16a may be detachable and provided with top and bottom flanges 20, 21 lapping flanges 22, 23 respectively of the top and side walls and attached thereto by screws 24, 25, respectively.

Front wall 14 is formed with a pair of holes 28, 29 equally spaced on opposite sides of the vertical middle of said front wall. A usual eye piece assembly 30 is fixed to the outside of the front wall 14 and provided with usual lenses 32, 33 covering the openings 28, 29, respectively.

A Risely prism 31 is located inside front wall 14, covering the hole 29, and is actuated by a usual operating rod 32a passing through a bearing hole 33a in side wall 16a. A knob 34 is attached to the outer end of the rod for turning the same to turn the Risely prism. A usual scale 34a may be marked on the outside of the side wall 16a for reading the angular position of the knob 34.

A vertical field separator 35 is fixed to wall 14 between holes 28, 29 and extends rearwardly of said front wall.

Mounted on the casing 10 are a plurality of substantially similar illuminated target assemblies 40 aligned with the holes 28, 29 and located near the rear wall 15. Only one of said assemblies will be described.

Each assembly 40 comprises an annular sleeve 41 to which are attached a pair of vertical, aligned rods 42, 43 radial with respect to said sleeve, Rod 42 extends upwardly through a bearing opening 44 in top wall 12. A knob 45 is attached to the upper end of rod 42 which extends above wall 12. A scale 46 marked on the upper surface of top wall 12 cooperates with the knob to measure its angular position. The rod 43 extends down through a bearing 47 in the bottom wall and into a bore 48 of a block 50 fixed to the underside of wall 13. A collar 51 receives rod 43 and may be fixed thereto for rotation therewith by a set screw 52 with said collar resting on the upper surface of said wall 13.

The rods 42, 43 extend through the axis of sleeve 41. Rotation of the knob 45 causes rotation of the sleeve 41 about the axis of rods 42, 43. The knob can be rotated through an angle of 90° to bring the axis of sleeve 41 from a front to rear orientation to a transverse orientation. Rods 42, 43 may comprise brass tubing.

Fixed within each sleeve 41 is a target 60. Target 60 comprises a circular glass plate or disc 61 to the front surface of which is attached or adhered a target pattern 62 made of black construction paper or other opaque sheet material. The target pattern 61 has a circular or ring shaped cut out 63 concentric with the axis of the sleeve and a center hole 64. One target has an upwardly offset or off center hole 65 and the other target has a downwardly offset hole 65a. Both holes 65, 65a are located between the center hole 64 and ring cut out 63.

Sleeve 41 has a front flange 41a and rear vertically aligned, diametrically disposed oppositely extending pins 41b disposed in a vertical line at the rear end of said sleeve.

Disposed and attached behind the glass plate 61 is a transparent, preferably plastic filter 68. The right filter may be red and the left filter may be green.

Disposed within each sleeve 41 and carried thereby is a conical reflector 70 carrying a lamp socket 70a at its apex end receiving the base of a flashlight lamp bulb 71. A rubber band 72 looped about pins 41b and the rear of the reflector keeps the reflector pushed forward within sleeve 41. Wires 73 connected to the terminals of the lamp socket 70a pass through holes in the rear wall 15 and are connected to a transformer 75 having plug blades 76 for connection to a wall outlet. The sockets 70a are connected in parallel circuit as shown in FIG. 5 of the drawing. The bulbs may be 1½ volts.

It will now be understood that the assemblies 40 are selectively rotatable about parallel vertical axes.

To test a patient's eyes, the patient looks through the eye piece assembly The lamps should be illuminated. The targets are set so that both face forwardly showing illuminated circles 63 with illuminated dots 64, 65 in each circle.

Then first turn one target only about its vertical axis. The patient first sees a circular outline in a mixture of red and green (some people will see yellow). The circle in one target is green because of the green filter and in the other target the circle is red because of the red filter. Stop turning the one target when the patient no longer sees one circle only, but reports that he sees one circle and one ellipse. The unmoved target will still be seen as a circle and the moved target as an ellipse. This point is called the break. The measurement of the "break" point is noted on the scale of the moved target.

In normal position, the plane of the target is perpendicular to the line of sight.

Then turn the target which was being moved back toward normal position. On the way back to normal, the ellipse will merge with the circle at some point. At that point note another reading on the scale of the moved target. This point is called the "recovery" point.

Then move the first target back to normal and repeat the procedure while the first target remains in normal position and the other or second target is moved to "break" point and to "recovery" point, and note the measurements on the scale of the second target.

The Risely prism is on the market and is well known. It is a variable power prism to increase prismatic power.

The center dots 64 are seen by both eyes as one dot as a fixation point of the target. It is what the patient is told to look at.

The offset dots 65, 65a check for suppression.

Suppression is having both eyes open but actually only using one eye for vision.

You ask the patient "How many dots do you see?" If the patient does not suppress he will see all three dots 64, 65 and 65a. If he does suppress, he will only see two dots, that is, dot 64 and dot 65 or 65a. The missing dot, whether it is the top or the bottom dot, indicates the suppressing eye.

The middle dot would be seen even if one or the other eye is suppressed because the unsupressed eye sees a center dot.

The type of suppression we are dealing with (when we talk about the three dots) is macular suppression as opposed to peri-macular suppression.

The peri-macular suppression is measured by the large circles. Suppose the patient sees all three dots, but instead of seeing a large circle which is a mixture of red and green (sometimes yellow), he sees the color of the circles as only green or only red during some phase of the testing procedure. Then you have peri-macular suppression. The angle extent of this suppresion area of the peri-macular suppression can be measured on the scales 46.

While circular target patterns have been illustrated, it will be understood that other targets of other shapes that can be made to change in shape or appearance can be used. Thus instead of circular targets 63, square or other rectangular shaped targets can be used. Also targets which contract in concentric circles can be used, such as camera shutter type mechanisms which make an opening concentrically smaller and larger.

It will thus be seen that there is provided an apparatus in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative only.

I claim:

1. Apparatus for testing a patient's eyes comprising a steroptical eye piece assembly through which the patient may look with both eyes, and a pair of target assemblies having normally similar appearing targets positioned within said eye assembly so that they can be viewed concurrently, one by one eye and the other by the other eye, and consequently fused, and means for mounting said targets for selective movement which will contract and expand the image of the selected target, as viewed by the eye looking at the selected target through said eye piece assembly, and cause the image of the selected target to become different from the image of the other target viewed by the other eye looking through said eye piece assembly, while retaining the center of said selected target in fixed position with respect to the center of said other target.

2. The combination of claim 1, and a base on which to mount said eye assembly and targets.

3. The combination of claim 1, and means to illuminate each target.

4. The combination of claim 1, and scale means cooperating with said moving means, to measure the "break" and "recovery" points upon moving each target assembly.

5. The combination of claim 1, each target comprising a ring.

6. The combination of claim 5, and said targets comprising dots similarly placed within said rings.

7. The combination of claim 6, one target further comprising a second dot offset from said first dot of said one target, and said other target comprising a second dot offset with respect to the first dot of said other target differently from the offset of the second dot of said one target.

8. The combintion of claim 7, both said second dots being located within said rings.

9. The combination of claim 5, said rings being differently colored.

10. The combination of claim 2, said base comprising a box, said moving means being mounted on said box for rotary movement on fixed parallel axes, and including manually engaged means outside said box, and scales located on the outside of said box to cooperate with said manually engaged means to measure "break" and "recovery" points of the eyes.

11. The combination of claim 10, and means to illuminate said targets.

12. The combination of claim 10, said eye piece comprising a pair of spaced eye viewing lenses and a separator between said lenses.

13. The combination of claim 1, said means to mount said targets for selective movement comprising means to mount said targets for movement on fixed parallel axes.

References Cited

UNITED STATES PATENTS

| | | | |
|---|---|---|---|
| 2,196,906 | 4/1940 | Sherman | 351—3 |
| 2,897,816 | 8/1959 | Williams | 351—3X |
| 3,258,303 | 6/1966 | Silverstein | 351—3X |

OTHER REFERENCES

Jani: "Age Factor in Stereopsis Screening," Amer. J. Optom. & Arch., vol. 43, No. 10, October 1966, pp. 653–657.

DAVID SCHONBERG, Primary Examiner

P. A. SACHER, Assistant Examiner

U.S. Cl. X.R.

128—76.5; 350—132; 351—33, 36